United States Patent
Hatjopoulos et al.

(10) Patent No.: US 8,176,841 B2
(45) Date of Patent: May 15, 2012

(54) COOKING IMPLIMENT SHELF AND FOOD WARMING DRAWER FOR USE WITH COMMERCIAL GRIDDLES AND CHARBROILERS

(76) Inventors: Triandafilos Hatjopoulos, Uxbridge, MA (US); George Hatjopoulos, Blackstone, MA (US)

(*) Notice: Subject to any disclaimer, the term of this patent is extended or adjusted under 35 U.S.C. 154(b) by 1115 days.

(21) Appl. No.: 11/895,697

(22) Filed: Aug. 25, 2007

(65) Prior Publication Data

US 2009/0025569 A1 Jan. 29, 2009

Related U.S. Application Data

(63) Continuation-in-part of application No. 11/880,851, filed on Jul. 24, 2007.

(51) Int. Cl.
*A47J 36/24* (2006.01)
(52) U.S. Cl. ............ 99/356; 99/339; 99/340; 99/449; 99/448; 126/9 R
(58) Field of Classification Search .......... 99/356, 99/339, 340, 400, 446, 447, 448, 449, 450, 99/482; 126/332–335, 337 A, 337 R, 338–340, 126/25 R, 9 R; 312/229, 282, 318
See application file for complete search history.

(56) References Cited

U.S. PATENT DOCUMENTS

| | | | | |
|---|---|---|---|---|
| 313,940 A | * | 3/1885 | Kehoe | 126/333 |
| 336,681 A | * | 2/1886 | Witzig | 99/379 |
| 2,332,760 A | * | 10/1943 | Smallen | 126/214 R |
| 2,696,812 A | * | 12/1954 | Merritt, Jr | 126/214 R |
| D175,295 S | * | 8/1955 | Caldwell | D7/406 |
| 2,887,154 A | | 5/1959 | Morningstar et al. | |
| 4,019,497 A | | 4/1977 | Koons | |
| 4,165,682 A | * | 8/1979 | Weiss | 99/331 |
| 4,321,857 A | | 3/1982 | Best | |

(Continued)

FOREIGN PATENT DOCUMENTS

CA 2090369 C 8/1997

OTHER PUBLICATIONS

American Griddle—picture Image downloaded and saved on Jul. 24, 2006.

(Continued)

*Primary Examiner* — Henry Yuen
*Assistant Examiner* — Jianying Atkisson
(74) *Attorney, Agent, or Firm* — Russ Weinzimmer; Russ Weinzimmer & Associates PC

(57) ABSTRACT

A cooking implement shelf is disclosed that is attachable to a commercial griddle and is able to support and position cooking implements such as a spatula, grill weights, cooking tongs, a salt shaker, etc, in a location that is readily accessible to a grill cook and does not taking up space on the cooking surface. One aspect of the invention is attachable to a staging feature on top of a barrier that runs along the backsplash of the griddle, while another aspect is directly attachable to the backsplash or to a side splash guard of the griddle. In preferred embodiments, the accessory is made from stainless steel, includes a warming tray and drip pan under the shelf, can be positioned above the cooking surface so as to warm items in the tray without harming them, and is adjustable horizontally and in height from 8" to 17" above the cooking surface.

11 Claims, 4 Drawing Sheets

U.S. PATENT DOCUMENTS

| | | | |
|---|---|---|---|
| 5,012,071 A | 4/1991 | Henke | |
| 5,542,347 A | 8/1996 | Joseph | |
| 5,678,531 A | 10/1997 | Byers et al. | |
| 6,056,146 A | 5/2000 | Varakian et al. | |
| 6,205,912 B1* | 3/2001 | Chiu | 99/339 |
| 6,973,927 B1 | 12/2005 | Stewart | |
| 2005/0051157 A1* | 3/2005 | Cuomo | 126/275 R |
| 2005/0223952 A1* | 10/2005 | Brewer et al. | 108/152 |

OTHER PUBLICATIONS

Anets Golden Grill—manual gas grill data and price sheet Image downloaded and saved on Aug. 16, 2007.

Garland Flue Risers—Master Series High Shelves, Backguards and Flue Risers Image downloaded and saved on Aug. 16, 2007.

Hobart Griddle—picture Image downloaded and saved on Jul. 24, 2006.

MagiKitch'n Equipment—Equipment price list Image downloaded and saved on Jan. 3, 2005.

Sectional Flue Risers—product list Image downloaded and saved on Aug. 16, 2007.

Star-Max Manual Gas Griddles—features and benefits description Image downloaded and saved on Jul. 24, 2006.

Ultra Max Charbroilers—picture Image downloaded and saved on Jul. 24, 2006.

Vulcan Griddle—models and features description page Image downloaded and saved on Oct. 2003.

Wolf Griddle—picture Image downloaded and saved on Jul. 24, 2006.

Bakers Pride Model XSG-36—specifications and features of this model page Image downloaded and saved on Jul. 24, 2006.

Bakers Pride Model XOB-848—specifications and features of this model page Image downloaded and saved on Jul. 24, 2006.

* cited by examiner

COOKING IMPLIMENT SHELF AND FOOD WARMING DRAWER FOR USE WITH COMMERCIAL GRIDDLES AND CHARBROILERS

CROSS-REFERENCES TO RELATED APPLICATIONS

This application is a continuation in part entitled to the benefit of U.S. patent application Ser. No. 11/880,851, entitled "APPARATUS FOR USE WITH COMMERCIAL GRIDDLES AND CHARBROILERS FOR IMPROVED SAFETY, ORGANIZATION, AND EFFICIENCY", filed Jul. 24, 2007, herein incorporated by reference.

FIELD OF THE INVENTION

This invention generally relates to commercial cooking equipment, and particularly to accessories for commercial griddles and charbroilers.

BACKGROUND OF THE INVENTION

A griddle (sometimes referred to as a grill) or a charbroiler is often the first piece of equipment purchased for a new restaurant because it is an essential focal point for activity in the kitchen. Owners of restaurants, hotels, hospitals, military bases, cruise ships, colleges, etc all use a griddle or a charbroiler to cook many of their offerings.

Cooking on a griddle or charbroiler requires the frequent use of cooking implements such as a spatula, grill weights, cooking tongs, a salt shaker, and so forth. These items are often placed or hung on nearby shelfs or racks, but this reduces cooking efficiency because it causes the cook to constantly step away from the griddle or charbroiler so as to obtain cooking implements and then return them to their storage locations. Sometimes cooking implements are placed on the cooking surface, conveniently within reach of a cook using the griddle or charbroiler, but this approach reduces the available cooking area and can also cause the implements to become undesirably warm.

Cooking on a griddle or charbroiler also frequently requires the temporary storing of certain food items, such as cuts of meat, in a manner that will keep them warm but will not cause them to be overcooked. This can happen, for example, when a number of different dishes are being prepared that require different cooking times but must be served simultaneously. It can also happen when the number of items to be simultaneously served exceeds the capacity of the cooking surface. Warming lamps are sometimes employed to keep such food items warm, but this can cause the food items to dry out, and also can cause the food items to no longer seem freshly cooked, since meats and other items cooked on a griddle or charbroiler are heated from below, and hence are warmer on the bottom, while a warming lamp heats these items from above, and thereby causes them to be warmer on the top.

SUMMARY OF THE INVENTION

A cooking implement shelf is disclosed that attaches to a commercial griddle or charbroiler and is able to support and position one or more cooking implements such that they are within easy reach of a grill cook using the griddle or charbroiler, while at the same time not obscuring any part of the cooking surface and not causing the implements to become undesirably warm. In preferred embodiments, the cooking implement shelf comprises a warming drawer attached under the shelf surface and a drip pan attached under the warming drawer, wherein the warming drawer is able to contain at least one food item such as a cut of meat or fish, the drip pan is able to catch any juices or other drippings that fall from the at least one food item, and the shelf, warming drawer, and drip pan can be positioned relative to the cooking surface such that food items contained in the warming drawer are warmed by heat rising from the cooking surface but are not damaged or overcooked by excessive heat.

In preferred embodiments, the shelf, the drawer, and/or the drip pan are made from stainless steel, and are positioned at least 8 inches above the cooking surface, and/or no more than 17 inches above the cooking surface. In further preferred embodiments, the warming drawer is positioned approximately 12 inches above the cooking surface.

One aspect of the invention is intended for use with a griddle or charbroiler that includes a barrier running along the backsplash of the griddle or charbroiler, wherein the barrier extends vertically at least 8 inches above the cooking surface and has a staging feature extending along the topmost portion of the barrier. In this aspect of the invention, the cooking implement shelf includes an attachment mechanism that attaches it to the staging feature. In preferred embodiments, the cooking implement shelf can be placed at any of a plurality of locations horizontally along the staging feature, or can be continuously moved or slid along the staging feature while attached.

In another aspect of the invention, the cooking implement shelf includes an attachment mechanism that attaches it directly to the backsplash or side splash guard of a commercial griddle or charbroiler. In preferred embodiments, the attachment mechanism is adjustable such that the cooking implement shelf can be flexibly positioned above the cooking surface.

BRIEF DESCRIPTION OF THE DRAWINGS

The invention will be more fully understood by reference to the detailed description, in conjunction with the following figures, wherein.

DETAILED DESCRIPTION OF PREFERRED EMBODIMENTS

Figure 1:
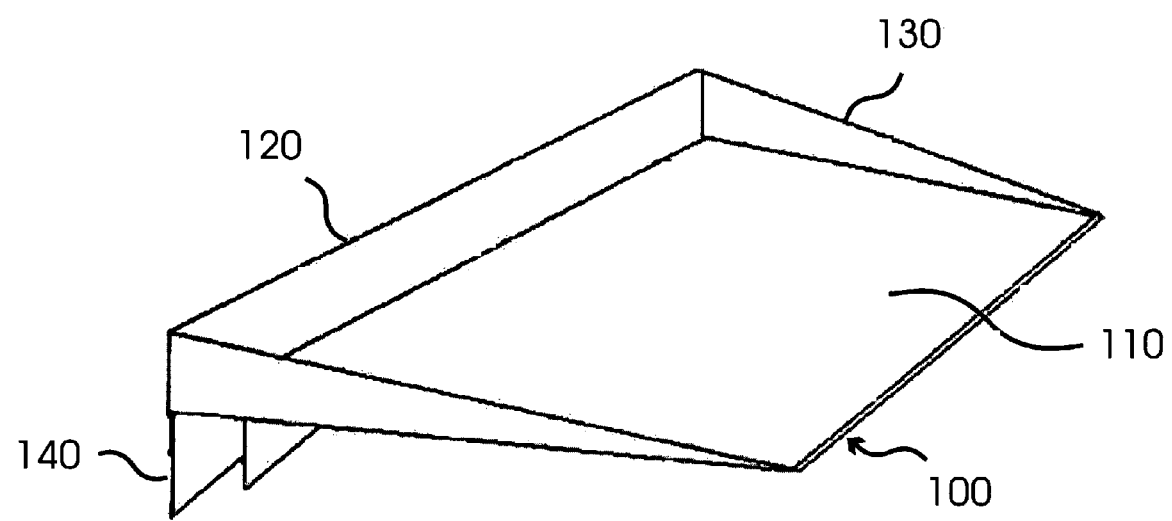
FIG. 1 is a perspective view of a preferred embodiment that comprises a cooking implement shelf with an attachment mechanism that is designed to attach the shelf to a staging feature on top of a barrier extending along the backsplash of a commercial griddle.

FIG. 1 is a perspective view of a cooking implement shelf 100 that includes a shelf surface 110 open at the front and bounded on the other three sides by a back guard 120 and two side guards 130. The cooking implement shelf 100 shown in FIG. 1 is a preferred embodiment of an aspect of the invention wherein the shelf is attachable to a staging feature that extends along the topmost portion of a barrier running along the backsplash of a commercial griddle or charbroiler and extending upwardly with respect to the cooking surface. In the preferred embodiment of FIG. 1, the attachment mechanism 140 is able to attach the shelf to a staging feature that has an essentially rectangular cross section, such as an inverted "L" or "J". The attachment mechanism 140 is a bracket that is able to rest on the staging feature so as to hold the shelf 110 in a stable, vertical position while allowing the shelf 110 to be moved horizontally along the staging feature. In preferred embodiments, the cooking implement shelf is made from stainless steel. While other materials can be used, such as aluminum, cast iron, copper, and the like, they are more costly. Stainless steel is also preferable because it is easy to clean, and is commonly used in commercial kitchens. Stainless steel is also a readily available material which can be readily shaped into the various embodiments of the cooking implement shelf 100.

Figure 2:
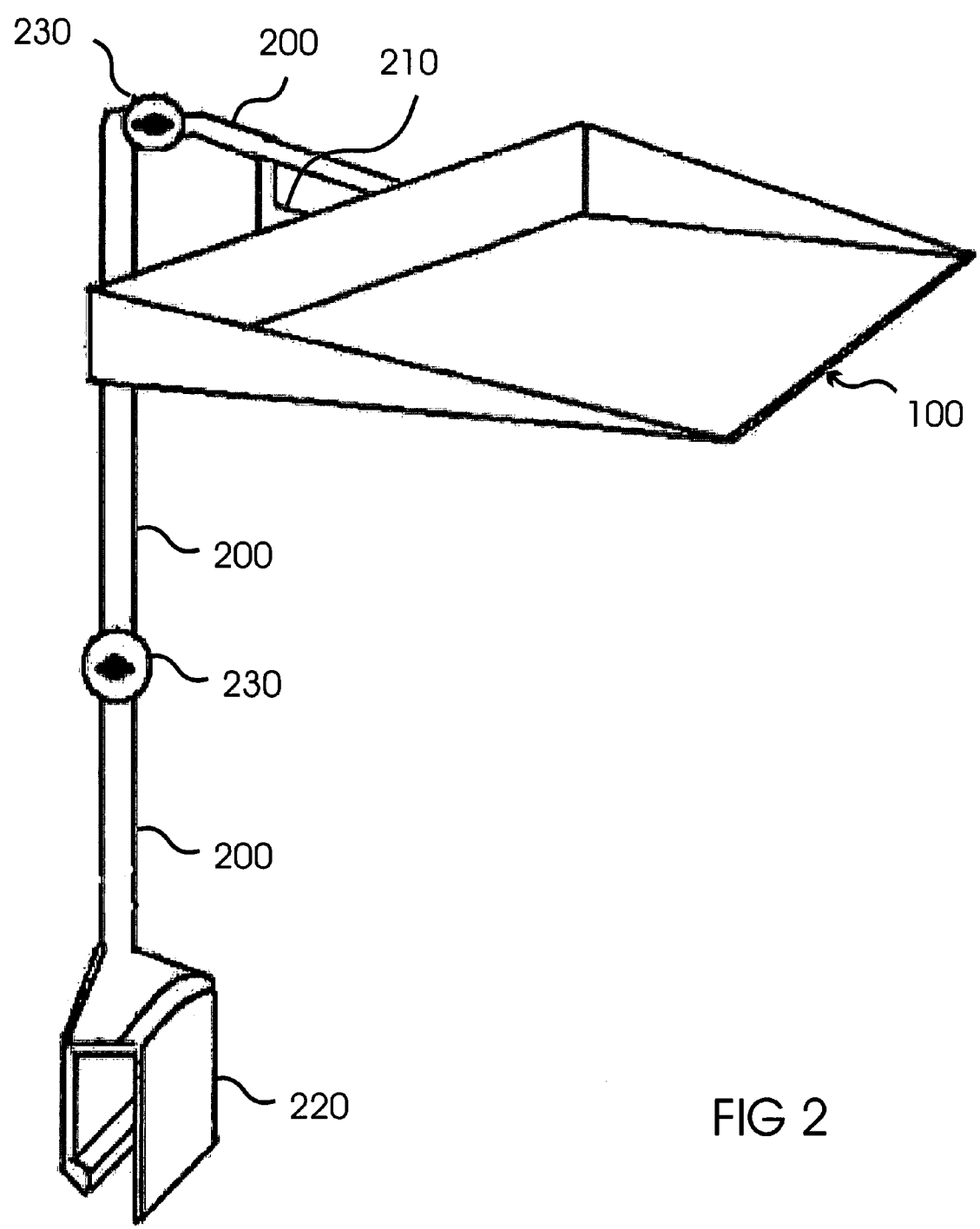
FIG. 2 is a perspective view of a preferred embodiment that comprises a cooking implement shelf with an attachment mechanism that is designed for attachment directly to a backsplash or side splash guard of a commercial griddle or charbroiler, and wherein the attachment mechanism is further adapted to allow flexible positioning of the cooking implement shelf above the cooking surface.

FIG. 2 is a perspective view of a preferred embodiment of the invention wherein the cooking implement shelf can be attached directly to the backsplash or side splash guard of a commercial griddle or charbroiler. In this preferred embodiment, the cooking implement shelf 100 is fixed to an adjustable support arm 200 by a bracket 210. The support arm 200 includes a clamping mechanism 220 that is attachable to the backsplash or side splash guard. The adjustable support arm 200 includes two pivots 230 that allow the position of the cooking implement shelf 100 to be flexibly adjusted relative to the cooking surface, so that the cooking implement shelf 100 receives the optimal amount of heat from the cooking surface of the griddle or charbroiler, and so that the cooking implement shelf 100 is conveniently accessible to a cook using the griddle or charbroiler.

Figure 3:
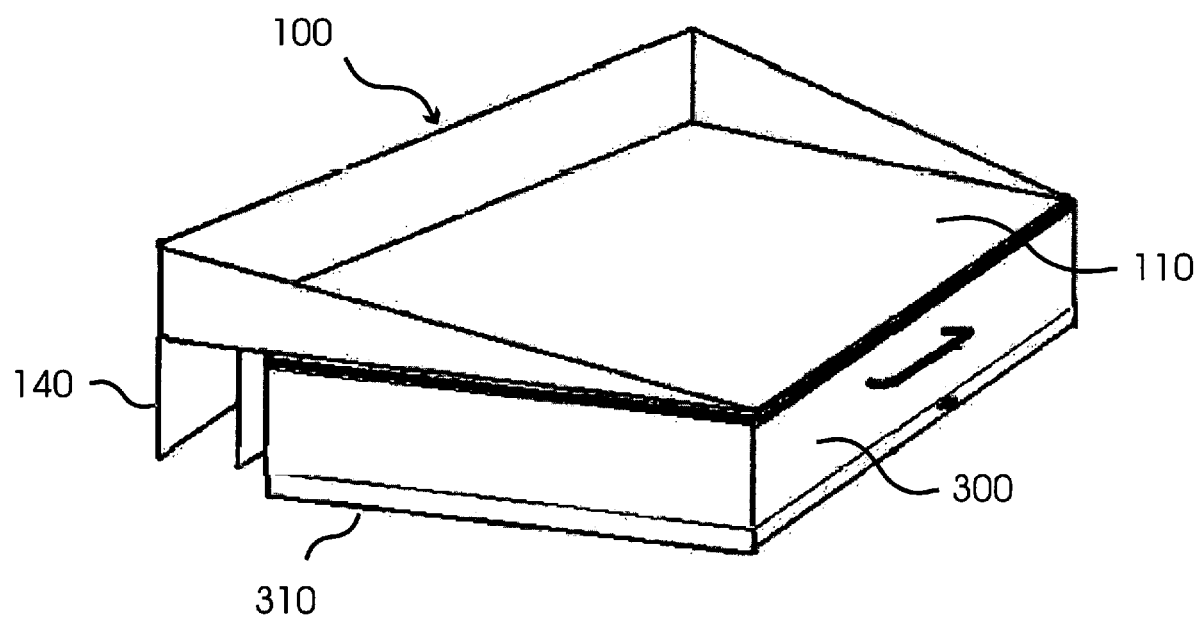
FIG. 3 is a perspective view of a preferred embodiment similar to the embodiment of FIG. 1, wherein the embodiment includes a warming drawer below the cooking implement shelf, and a drip pan below the warming drawer.

FIG. 3 is a perspective view of a preferred embodiment that is similar to the preferred embodiment of FIG. 1, except that the invention includes a removable warming drawer 300 positioned below the shelf 110, and a drip pan 310 positioned below the drawer. In this preferred embodiment the drawer 300 includes a bottom with openings (not shown) that allow drippings from food items contained in the drawer to fall through and onto the drip pan 310. The drip pan 310 is positioned to catch any such drippings and prevent them from reaching the cooking surface below. In preferred embodiments, the drip pan 310 can be easily removed for cleaning.

Figure 4:
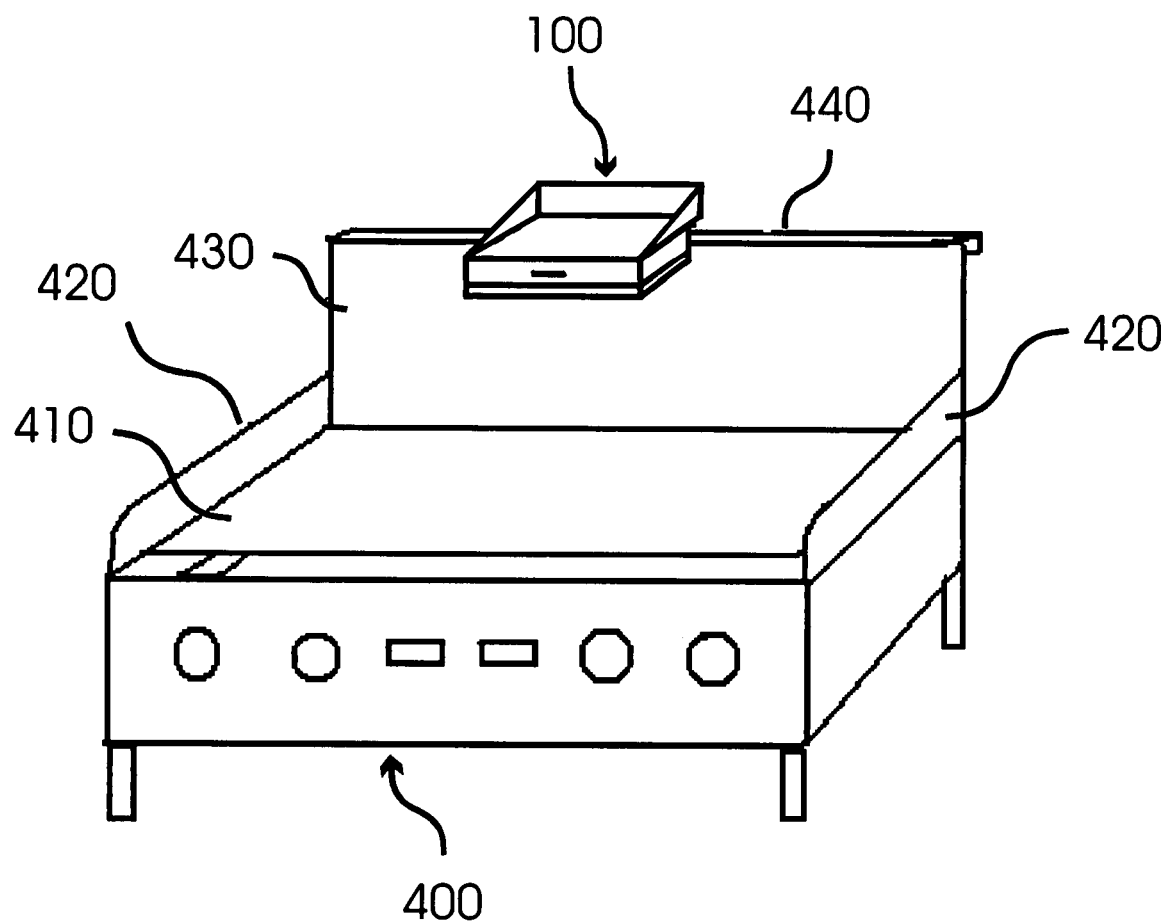
FIG. 4 is a perspective view of a commercial griddle that includes a barrier extending along the backsplash and a staging feature on top of the barrier, with the preferred embodiment cooking implement shelf and warming drawer of FIG. 3 attached to the staging feature.

FIG. 4 is a perspective view of a commercial griddle 400 with a cooking surface 410, side splash guards 420 and a backsplash (not shown). A barrier 430 runs along the backsplash and extends upwardly with respect to the cooking surface 410, and a staging feature 440 extends along the topmost portion of the barrier. A cooking implement shelf 100 configured according to the preferred embodiment of FIG. 3 is attached to the staging feature 440 by an attachment mechanism that rests on the staging feature 440 and allows the shelf 100 to slide horizontally along the staging feature 440.

Other modifications and implementations will occur to those skilled in the art without departing from the spirit and the scope of the invention as claimed. Accordingly, the above description is not intended to limit the invention except as indicated in the following claims.

What is claimed is:

1. A cooking implement shelf for use with a commercial griddle, the commercial griddle having a cooking surface, a backsplash, a barrier extending along the backsplash and extending upwardly with respect to the cooking surface, and a staging feature extending along the topmost portion of the barrier, the staging feature being at least 8 inches above the cooking surface, the cooking implement shelf comprising:
   a shelf surface that is able to support at least one cooking implement;
   an attachment mechanism that is able to attach the shelf surface to the staging feature of the barrier, wherein the attachment mechanism is able to support the shelf surface in an essentially horizontal orientation and is adapted to allow the shelf surface to be attached to any of a plurality of positions on the staging feature;
   a removable warming drawer mounted below the shelf surface, wherein the bottom of the warming drawer includes openings that allow drippings from food items contained in the drawer to fall through; and
   a drip pan mounted below the warming drawer, positioned so as to catch drippings that fall through the openings.

2. The cooking implement shelf of claim 1, wherein the attachment mechanism is adapted to attach the shelf surface to an accessory staging feature having a cross-section shaped like an inverted squared "J".

3. The cooking implement shelf of claim 1, wherein the attachment mechanism is adapted to attach the shelf surface to an accessory staging feature having a cross-section shaped like an inverted "L".

4. The cooking implement shelf of claim 1, wherein the attachment mechanism is adapted to attach the shelf surface to an accessory staging feature having a cross-section shaped like a straight vertical wall having a thin, smooth, flat top.

5. The cooking implement shelf of claim 1, wherein the cooking implement shelf is made of stainless steel.

6. The cooking implement shelf of claim 1, wherein the attachment mechanism is configured to allow the shelf surface to be moved horizontally in an essentially continuous manner along the staging feature while remaining attached to the staging feature while maintaining its essentially horizontal orientation.

7. The cooking implement shelf of claim 1, wherein attaching the attachment mechanism to the staging feature places the shelf surface no more than 17 inches above the cooking surface of the commercial griddle.

8. The cooking implement shelf of claim 1, wherein attaching the attachment mechanism to the staging feature places the shelf approximately 12 inches above the cooking surface of the commercial griddle.

9. A cooking implement shelf for use with a commercial griddle, the commercial griddle having a cooking surface and a splash barrier that is at least one of a backsplash and a side splash guard, the cooking implement shelf comprising:
   a shelf surface that is able to support at least one cooking implement; and
   an attachment mechanism that is able to attach the shelf surface to the splash barrier of the griddle, the attachment mechanism being configured to allow the height of the shelf surface above the cooking surface of the griddle to be continuously adjusted through a range of locations relative to the cooking surface of the griddle at which it is able to support the shelf surface in an essentially horizontal orientation above the cooking surface of the griddle;
   a removable warming drawer mounted below the shelf surface, wherein the bottom of the warming drawer includes openings that allow drippings from food items contained in the drawer to fall through; and
   a drip pan mounted below the warming drawer, positioned so as to catch drippings that fall through the openings.

10. The cooking implement shelf of claim 9, wherein the cooking implement shelf is made of stainless steel.

11. The cooking implement shelf of claim 9, wherein the attachment mechanism is configured to allow the height of the shelf surface above the cooking surface of the griddle to be substantially continuously adjusted over the entirety of a range that extends from a first position of no more than 8 inches from the cooking surface to a second position of no less than 17 inches from the cooking surface.

* * * * *